Feb. 25, 1941.   D. C. KENNEDY   2,233,133
WIRE-TYING DEVICE FOR HAY PRESSES
Filed Sept. 28, 1939   4 Sheets-Sheet 2
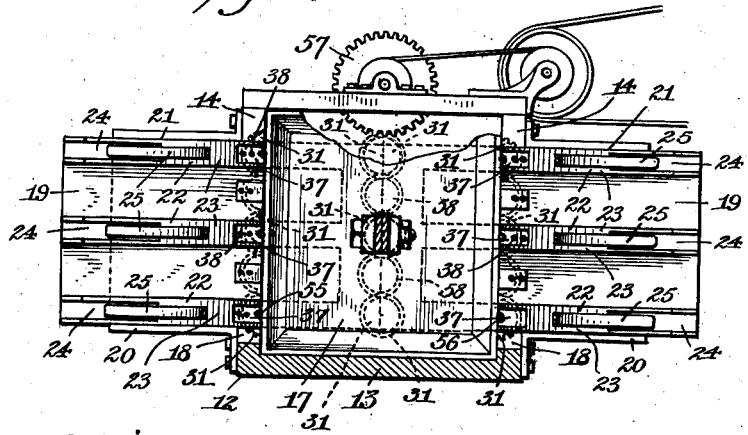
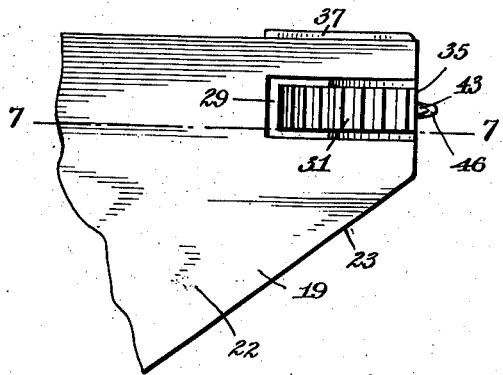
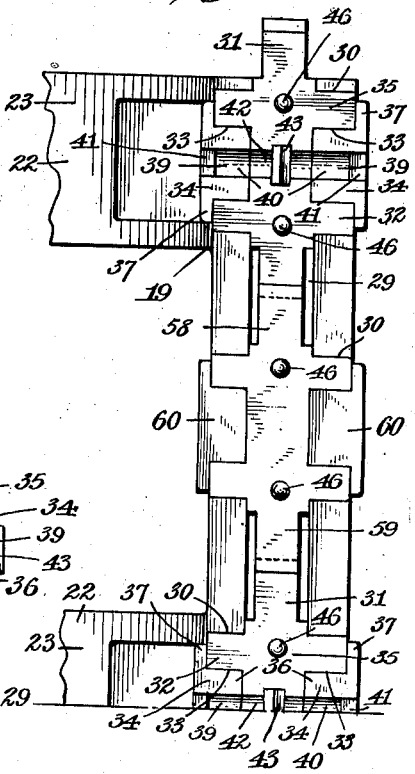
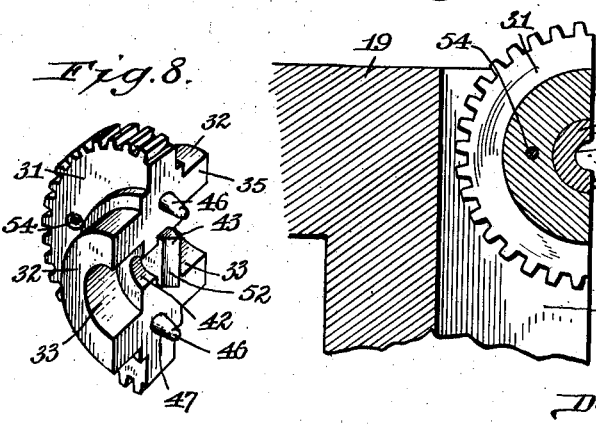
Daniel C. Kennedy
Inventor
By Emil Neuhart
Attorney.

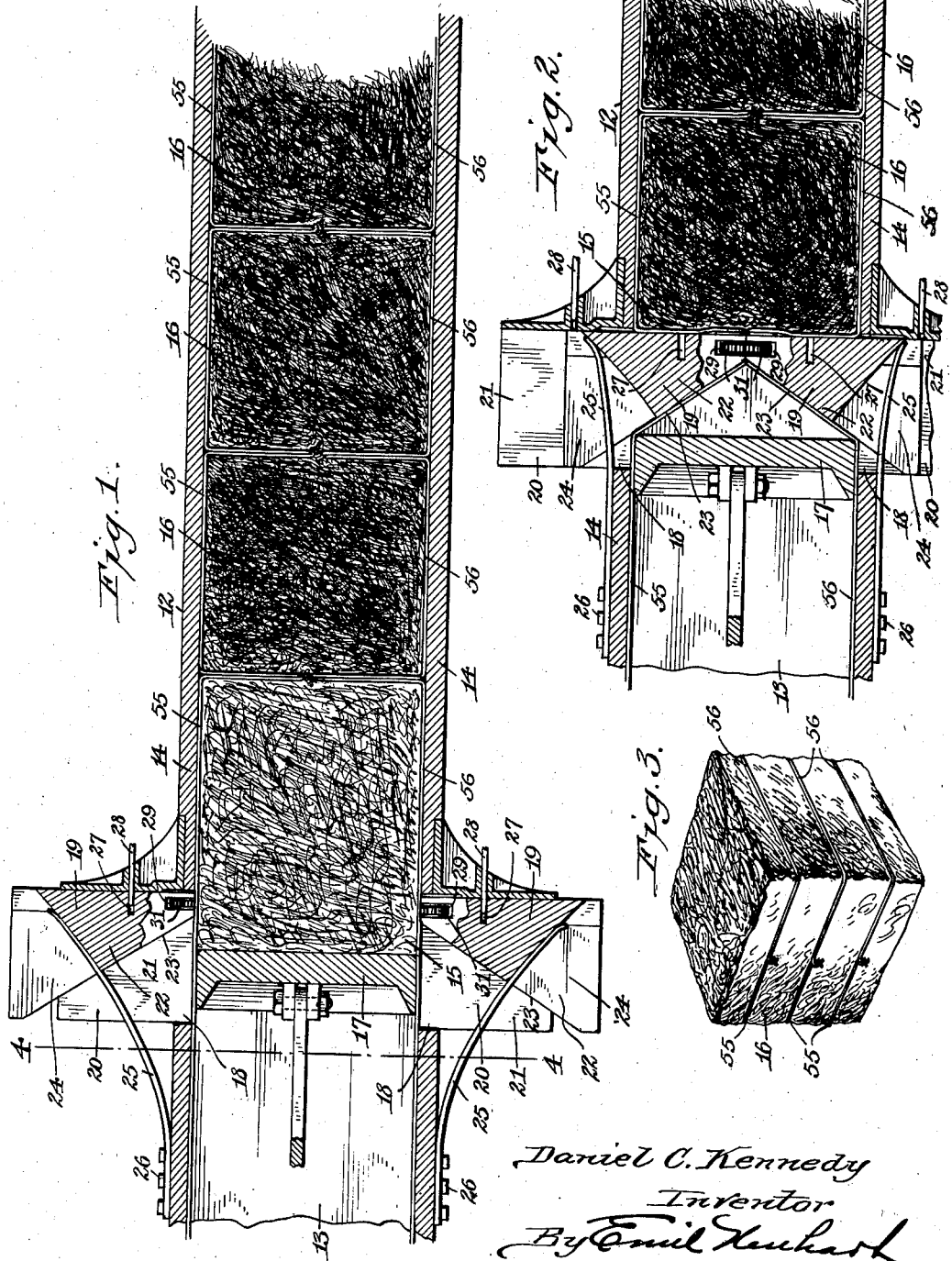

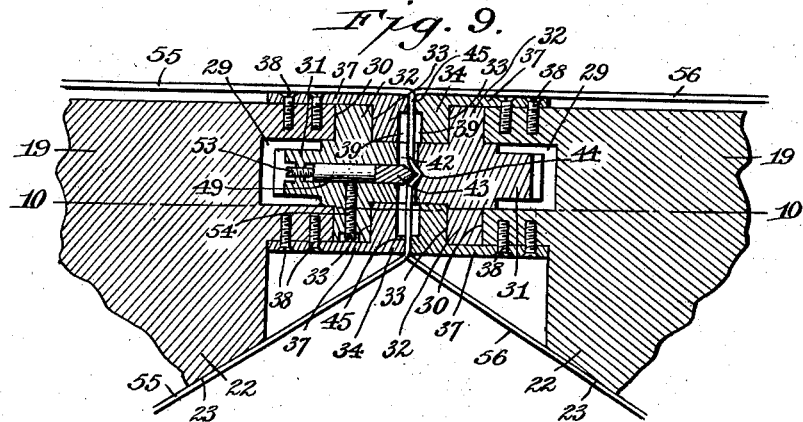
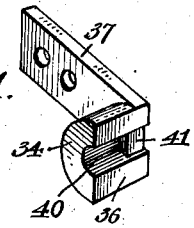
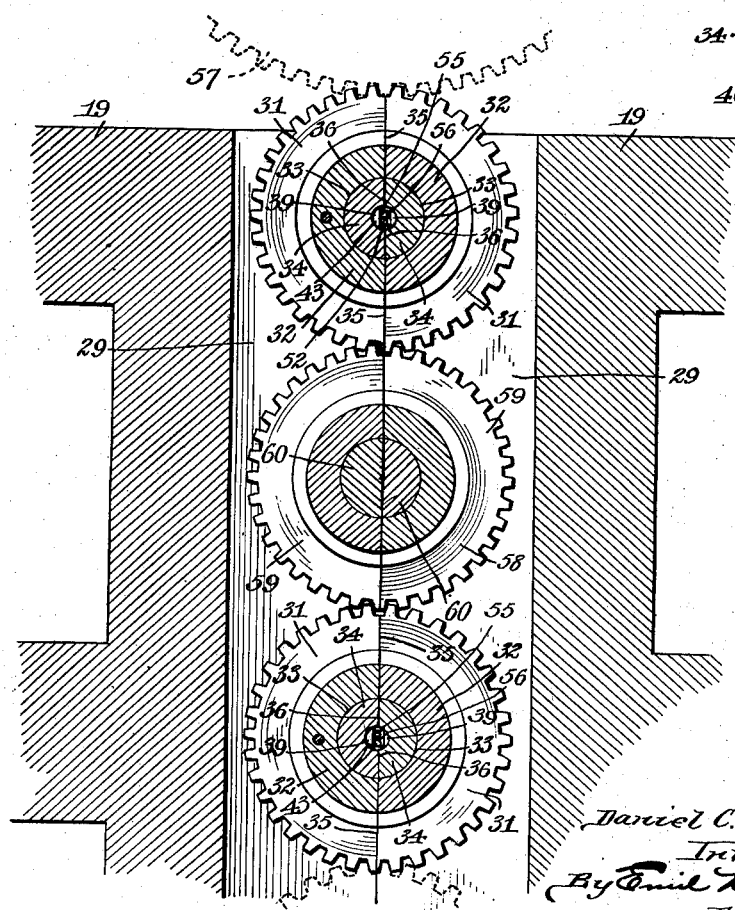

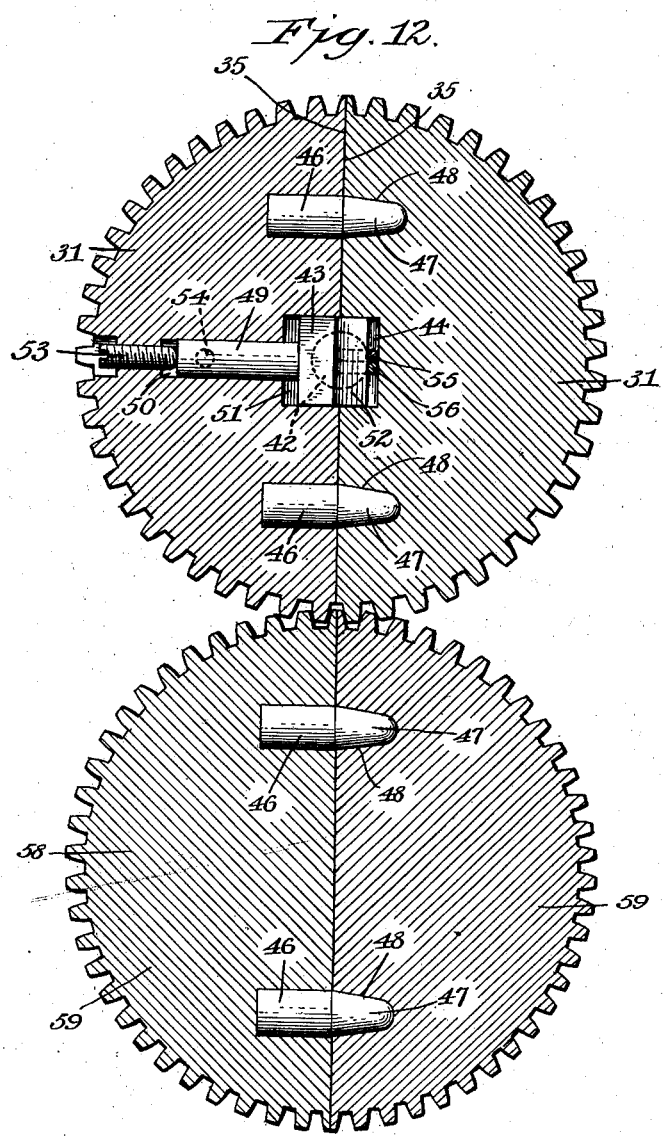

Patented Feb. 25, 1941

2,233,133

UNITED STATES PATENT OFFICE 2,233,133

WIRE-TYING DEVICE FOR HAY PRESSES

Daniel C. Kennedy, Caledonia, N. Y., assignor of one-half to Calder D. Kennedy, Niagara Falls, N. Y., and one-half to Charles K. Pike, Caledonia, N. Y.

Application September 28, 1939, Serial No. 296,956

15 Claims. (Cl. 140—115)

This invention relates to a bale-tying device, and more particularly to a tying device adapted to be used in connection with a hay-baling press.

One of the objects of the invention is to produce a bale-tying device capable of use with any standard type of baling press, and which is simple in construction and efficient in action to tie hay compressed within the baling press preparatory to delivering the same from the latter.

A still further object of my invention is to provide a device which will effectively act upon two strands of wire tied together at one of their ends and extending around three sides of a body of compressed hay, the device serving to bring said strands together at the fourth side of the body of hay, tie the same centrally of said fourth side, and clip the wire where tied so as to complete the bale of hay.

A further object of the invention is to produce a simple tying device designed to act upon two pieces of wire terminally intertwisted and fed from separate sources of supply; in surrounding a newly compressed body of hay with said two strands of wire and twisting said strands together centrally of said bale; and finally severing the wire mid-length of the twisted region to effectively tie the compressed body of hay in bale form and to terminally intertwist the two severed strands of wire preparatory to compressing a supply of hay to form another bale.

A still further object of my invention is to utilize a pair of semi-gears; provide means for encompassing a compresed body of hay with two strands of wire and simultaneously clamping said strands between said semi-gears while converting the latter into a complete gear or tying unit; and utilizing suitable means for rotating said complete gear or tying unit while the wires are clamped together so as to twist the same together, to clip the so intertwisted portions of the wires, and to separate the wires bound around the so baled hay from the wires designed to encircle the next bale of hay to be pressed to form.

With these and other objects in view to appear hereinafter, the invention consists in the novel features of construction and in the arrangement and combination to be hereinafter more fully described and particularly pointed out in the subjoined claims.

In the drawings,

Fig. 1 is a horizontal section of a portion of a hay-baling press having my invention embodied therein, the parts of the tying device being normally disposed at opposite sides of the hay runway or press box in which hay is to be compressed and bound into bale form.

Fig. 2 is a similar view of a smaller portion of the press showing the two parts of the tying device moved or projected into the hay runway or press box in a position to be operated for twisting or tying the wires together and severing the same where intertwisted or tied.

Fig. 3 is a perspective view of a bale of hay showing three strands of wire around the same and the manner in which the wires are intertwisted and clipped.

Fig. 4 is a transverse section taken on or about line 4—4, Fig. 1.

Fig. 5 is a plan view of the inner end of one of the carriers supporting the semi-gears.

Fig. 6 is an end view of a portion of one of the semi-gear carriers.

Fig. 7 is a longitudinal section taken on line 7—7, Fig. 5.

Fig. 8 is a detached perspective view of one of the semi-gears showing the wire nicking element which forms part thereof, this semi-gear being designed to co-act with a mating semi-gear to nick the wires when the two semi-gears of each tying device are brought together to make a complete gear or tying unit.

Fig. 9 is a horizontal section through opposite gear-carriers in the act of clamping the wires and nicking the same between two semi-gears.

Fig. 10 is an enlarged vertical section through portions of the gear-carriers, taken on line 10—10, Fig. 9.

Fig. 11 is a detached perspective view of one of the internal bearing elements employed to retain or journal the semi-gears in the gear-carriers, hereinafter also referred to as a keeper.

Fig. 12 is an enlarged section taken centrally through one of the complete tying gears or units and an intermeshing intermediate gear.

In the accompanying drawings I have illustrated my improved semi-gears in association with means for bringing them into juxtaposition and for separating them, the means for this purpose being of simple and what I consider at this time preferred form. It is to be understood, however, that my improved tying device may be used in connection with various types of mechanisms for bringing them into action and in connection with any type of hay-baling press designed to place binding wires around a compressed body of hay and twist the same preparatory to moving the baled hay along the machine to be discharged therefrom.

There are many well known makes of hay-baling presses now being manufactured, and it is to be understood that my improved bale-tying device is adapted for use in connection with any of them, more particularly with any of the type in which a horizontal hay runway or elongated press box is employed, along a given area of which loose hay is introduced to be compressed against a suitable abutment, such as a bale of hay previously formed and bound and momentarily retained in the hay runway or press box, or otherwise established. In the accompanying drawings the invention is shown applied to the latter type of hay-baling press, wherein the reference numeral 12 designates a horizontal hay runway or elongated press box comprising as essential parts thereof a bottom 13 and two spaced-apart side walls 14. This runway or press box may also have its top closed, but if so formed, it will be provided with an opening to introduce loose hay by means of a hopper (not shown) arranged over the opening, or hay may be supplied thereto in any other suitable manner; this being immaterial so far as my particular invention is concerned.

The portion of the hay runway or press box 12 designed to receive the loose hay may be considered a hay-receiving chamber and is designated by the numeral 15, it having for its confining elements the bottom and side walls of the runway or press box and the last of the bales of hay 16 advanced therein will serve as an abutment against which the loose hay is compressed into unbound bale form.

In the drawings several bales of hay are shown within the runway or box, and these are to be automatically discharged therefrom in any approved manner. They are, however, momentarily retained therein so that the bale last tied will serve as an abutment wall. Within the runway or box is a plunger 17 which is reciprocated by any suitable means and is normally spaced from the last bale tied, to form the hay-receiving chamber 15 between the two.

The side walls 14 of the hay runway or press box are provided along the hay-receiving chamber with vertical openings 18 through which gear-carriers 19 are adapted to move. These gear-carriers are guided for movement in a support or frame 20 fastened to the side walls of the runway or box, each of said supports or frames having a slide-way 21 formed therein which receives one of the gear-carriers. These gear-carriers are normally disposed with their inner ends substantially flush with the inner sides of the side walls 14 and have wire-guiding portions 22 provided with inclined rear edges 23 for a purpose to appear hereinafter. The wire-guiding portions are therefore of substantially triangular formation and at their outer ends are slotted, as at 24, to receive the free ends of leaf pressure springs 25 fastened to the outer sides of the side walls 14, as at 26.

It is of course understood that the hay-receiving chamber 15 is of greater length than any dimension of the bales of hay. Therefore, in Fig. 1 the hay within the receiving chamber is shown comparatively loose and ready to be compressed by the forward movement of the plunger 17.

I have shown the gear-carriers in Fig. 1 located in their normal positions, and for this purpose each gear-carrier may have a pin socket 27 into which lock-pins 28 are thrust, which pins may be actuated in any approved manner for releasing the gear-carriers and permitting the pressure springs 25 to force the same into the hay runway or press box. As will be clear upon examination of Figs. 1 and 2 of the drawings, these lock-pins remain in locking position until the plunger has compressed the hay to or beyond the size of the bale to be tied; and upon retrograde movement of the plunger, said lock-pins 28 are withdrawn from the sockets 27 in the gear-carrier to allow said pressure springs 25 to function.

It is of course to be understood that the wires used for tying the compressed hay may be supplied to the press in any approved manner, but it is essential that if three wires are employed on each bale of hay, three lengths of wire will be supplied to the hay runway or press box at each side thereof. If desired, the inner surface of the side walls 14 may be grooved to receive these wires, since this is the accepted form in several makes of hay presses, while in others, grooves are dispensed with and the wires directed along the inner surfaces of said side walls. Usually these wires are released individually from spools, (not shown), which pay out the wires as called upon under the operation of the parts utilized to compress the hay and tie the bales.

Since this invention is not concerned with the mechanism for operating the lock-pins, it will be apparent that suitable mechanism may be provided for this purpose, timed to the operations of other parts of the machine if desired.

The gear-carrier at each side of the hay runway or press box forms one-half of the tying device, and each is notched vertically from top to bottom at the inner ends of its triangular wire-guiding portions 22, as at 29, said inner ends being also provided with semi-circular grooves 30 which intersect said notches. In each notch 29 a plurality of semi-gears or semi-gear wheels 31 are disposed, the semi-gears being slightly narrower than the notch and provided with semi-cylindrical hub portions 32 extending from opposite sides thereof and fitted into the semi-circular grooves 30. The walls of the grooves 30 therefore serve as bearings for the hub portions of these semi-gears, and these hub portions are provided with semi-circular grooves 33 into which fit semi-cylindrical keepers 34. The flat side 35 of each semi-gear 31, and the flat side 36 of each keeper are flush and alined with the inner end of the gear-carrier. Each keeper has an angular retainer plate 37 extending from its outer end which bears against and is secured to a suitable surface of the gear-carrier, where it is secured in place by securing screws 38. The keepers are also provided on their flat surfaces with wire-receiving grooves 39 which vary in formation along their lengths, the inner portions 40 of said grooves being semi-circular and the outer portions 41 right-angular and comparatively shallow, the depth of said outer portions equaling approximately one-half the diameter of the wire used to bale the hay, the purpose of which will appear hereinafter. The inner semi-circular portions 40 of each of these grooves coincide with a similar wire-receiving groove 42 formed in the flat face of the semi-gear 31. Arranged midway between the ends of the groove 42 is a replaceable V-shaped rib 43 serving as a wire nicker or cutter. The keepers 34 are therefore retained within the semi-circular grooves 33 of their associated semi-gears by means of the retained plates 37, or they may be otherwise retained in place. This will enable the hub of the completed gear or tying unit, comprising the two opposite hub portions 32, to move rotatively between the semi-cylindrical keepers 34 and the walls of the semi-circular grooves 30 formed in the ends of the gear-carriers.

As hereinbefore stated, the semi-gears are employed in pairs, and while one semi-gear of each pair has a nicker or cutter, the other is provided with a V-shaped groove 44 arranged at a right angle to the wire receiving groove 42 formed therein. As clearly shown in Fig. 9, the diagonally disposed faces of the V-shaped rib are at more acute angles than the diagonally disposed walls of the V-shaped groove 44. The semi-gears are disposed in pairs in a horizontal plane and are consequently movable toward and from each other, one pair of semi-gears being employed for each pair of wires used to bind the bale of hay. If, therefore, as shown in Fig. 3, each bale is bound with three wires, three pairs of semi-gears are employed, and when moving the gear-carriers at opposite sides of the hay press inwardly into the hay runway or press box, the flat faces of each pair of semi-gears are brought into contact with each other so that they form a complete gear-wheel or tying unit, between which the binding or tying wires associated therewith are clamped, as clearly shown in Figs. 9 and 10.

Although the semi-gears are in contact, the inner walls of the comparatively shallow outer groove portions 41 are spaced apart a distance substantially that of the diameter of the wires used, with the result that when the gear-carriers are in co-operation, the wires are firmly clamped one above the other at the points 45 and both strands of wires are engaged by the V-shaped rib, referred to as a nicker or cutter, and by the latter are forced into the V-shaped groove 44, being partly severed since the sharp edge of the nicker or cutter is spaced a distance from the apex of the V-shaped groove equaling any desired fraction of the diameter of each of the wires. The wires are also somewhat bent around the nicker or cutter, as clearly shown in Fig. 9. To assure the proper relationship between the semi-gears of each pair when the gear-carriers are brought into contact with each other, one of said semi-gears is provided with dowel pins 46 which project outwardly from the flat face thereof and have their projecting portions somewhat tapered, as at 47. The other semi-gear of each pair is provided with dowel pin sockets 48 shaped to conform to the tapered projecting ends of said dowel pins and to therefore facilitate the entrance of said dowel pins thereinto.

In order to enable the nicker or cutter 43 to be easily sharpened for nicking or cutting the wires, I make the same removable from the semi-gear of which it forms part, and to this end provide it with a shank 49 adjustable in a bore 50 opening into a comparatively large pocket 51 formed in the semi-gear and opening to the flat face thereof. Said pocket is of the size and formation of the nicker or cutter which is in the form of a blade disposed at a right angle to said shank and having its opposite sides beveled, as at 52, to form a sharp cutting edge. An adjusting screw 53 is adjustably arranged within the semi-gear and it engages the end of the shank. This adjusting screw is adjustable from the peripheral edge of the semi-gear and enables the cutting edge of the nicker or cutter to be adjusted with respect to the V-shaped groove 44, thereby nicking the wire to the extent necessary to cause separation of the wires disposed between the two semi-gears or members of the tying units when such wires are twisted to the desired degree. For the purpose of retaining the nicker or cutter in its adjusted position, the set screw 54 threaded into the semi-gear from one side thereof engages the shank 49 as clearly shown in Fig. 9.

It is to be noted that when starting to compress hay to form the first bale, the ends of the wires 55, 56 at opposite sides of the hay runway or press box are tied or twisted together in any suitable manner and the wires bent so that portions adjoining the twist extend across the hay runway or press box at the forward end of the hay-receiving chamber 15. The hay introduced into said receiving chamber is compressed by the plunger 17, a suitable abutment (not shown) being provided for this purpose against which they hay is compressed. When compressed to the size of the bale to be bound with wire, or to a size somewhat smaller than that which the bale is to be, allowing for expansion of the hay, the gear-carriers are released and moved inwardly, the inclined rear edges of the wire-guiding portions thereof engaging the plunger and moving the same rearward with any assistance which the mechanism for operating said plunger may provide.

As clearly shown in Fig. 1, the strands of wires at each side of the runway or press box are positioned within the wire-receiving grooves 39 of the keepers 34 and those of the semi-gears at the same side of the runway or press box, and as the carriers are moved inward, portions of these wires are carried inwardly until the inner ends of the opposite keepers come in contact with each other, as shown in Fig. 2, at which time the wires will have been bent into the shape shown in said figure. The mechanism for effecting this step in the operation of the gear-carriers may be varied, since it forms no part of my invention.

The gear-wheel formed by the uppermost semi-gears 31 journaled in the gear-carrier are brought into mesh with a gear-wheel 57 when the gear-carriers are projected into the runway or press box 12; and by suitable mechanism, this gear-wheel may be rotated to cause rotation of the several gear-wheels jointly carried by the opposite gear-carriers. In order to transfer rotation from the uppermost gear-wheel to the remaining gear-wheel or gear-wheels employed for twisting the binding wires, gear-wheels 58 are employed which are also formed of semi-gear wheels 59 retained on the respective carriers 19 by keepers 60 fastened to the carriers in the same manner as the keepers 34 of the semi-gear wheels 31. Therefore, all gear-wheels employed to clamp and twist the binding wires are rotated in the same direction. Each pair of semi-gears 31 may be termed a twisting or tying unit, and the gears formed by these semi-gears and the gears formed by the semi-gears 59 constitute a train of gears which are vertically disposed and may be referred to as divided or bisected gears formed of semi-gears movable toward and from each other under the reciprocating movement of the gear-carriers.

After the first bale of hay is bound with the wire, it is employed as the abutment for the hay being compressed into bale form, and as the hay last compressed is bound and tied, the bales are moved forward through the hay runway or press box 12, the last bale tied always serving as the abutment in co-operation with the plunger 17.

From the foregoing it will be understood that when the material is fed into the hay-receiving chamber 15 and compressed by the plunger, it will be intercepted by the twisted or connected ends of the wires lying in the path thereof and against the last bale of hay bound and tied. As the compression of the hay progresses, the cross portions of the wires, then obliquely disposed as shown in Fig. 2, will assume a transverse position and lie against the bale of hay last formed, the wires being caused to be paid out from the respective spools serving as a supply for the same for this purpose. When the hay has been compressed to bale form, the gear-carriers are forced inwardly by the pressure springs 25 after actuating the lock-pin 28. During this inward movement, portions of the wires will be carried inwardly with the gear-carriers behind the body of hay just compressed. With the parts thus positioned, the semi-gears forming the tying unit and the intermediate gear units 58 will be rotated by any suitable means forming no part of this invention. It is, however, to be understood that when the gear-carriers are brought into juxtaposition, the nicker or cutter 43 will nick or indent the wires, but will not completely cut or sever the same, for the reason that the nicking edges of these nickers or cutters do not extend completely into the V-shaped grooves 44 of the co-acting semi-gears 31. During the rotation of the semi-gears 31 and 59 which are clamped together by gear-carriers to form complete gears or gear-wheels, the wires which have been brought inwardly in rear of the body of hay last compressed will be twisted, one-half of the length of the wire extending across each of the wire-receiving grooves 39 and 42 being designed to form parts of the wires binding the bale last compressed, while the other half is designed to serve as a means of connecting the ends of the wires which are to be utilized for binding the next bale.

The wires clamped between the semi-gears 31 are twisted together during rotation of the gears formed by the semi-gears 31, and during this action they are severed where nicked by the nicker or cutter 43.

When the gear-carriers are moved outwardly, the wire extending in rear of the last bale of hay will have been severed from the wires of said bale, and they will assume substantially the position shown in Fig. 2. When the plunger is moved rearwardly to its full extent, a new supply of hay to be baled is introduced into the hay-receiving chamber 15, and as this hay is pressed forwardly, the portions of the wires obliquely disposed in Fig. 2 will be moved into substantially transverse position or at a right-angle to the portions of the wires lying against the side walls of the runway or press box. Thus these wires, during the act of compressing the hay, will line in front of the bale being formed and along the sides thereof so that when the quantity of hay fed into the runway or press box is compressed to the desired bale form or preferably into an area less than the area of the completed bale, the gear-carriers will be moved inwardly and the operation described duplicated.

It is to be understood that the mechanism for rotating the twisting gears or units will be such that when the twisting is completed the semi-gears will have their flat faces flush with the iner ends of the gear-carriers so that when these gear-carriers are moved upwardly and again brought together within the hay runway or press box, the dowel pins 46 projecting from one semi-gear will automatically enter the dowel pin sockets 48 in the other semi-gear of each pair.

From the foregoing description taken in connection with the accompanying drawings, it will be apparent that the inventive thought herein involved resides in a twisting device comprising two semi-gears or other twisting elements in association with means for moving the semi-gears or twisting elements toward and from each other, to the end that tying or binding wires may be clamped between the two semi-gears or elements and be rotated by suitable means to twist the wires, and when twisted causing a severance of the wire along the twisted region. It is obvious, therefore, that the mechanism for moving the parts of the twisting or tying devices together and for separating such parts may be varied in construction and operated in any suitable manner, and that the mechanism for rotating the gears, formed by bringing the semi-gears together, may also be varied, much of which will depend on the particular make of baling press in which this invention is to be employed.

In view of the description, it will be clear that as the gears comprising the semi-gears 31 rotate, the semi-gears will, during such rotation, alternately leave one of the gear-carriers and be transferred to the other, so that each gear-carrier serves as a support for both semi-gears 31 during each complete revolution of the gear-wheel formed thereby.

Having thus described my invention, what I claim is:

1. In a wire-twisting device, two elements movable toward and from each other to form the tying device, said elements when moved toward each other serving to clamp two baling wires passed around a bale, one of said elements having a projecting cutter to nick both wires, and means for rotating said device so as to twist the wires clamped therein and passed around a bale and to cause them to be severed where nicked.

2. A wire-twisting device, comprising two semi-circular parts, means for separately carrying said parts and moving the same into juxtaposition with each other so as to clamp two strands of wires therebetween, one of said parts having a projecting cutter to nick said wires and the other a groove to receive said cutter, and means for rotating said parts so as to twist the wires where clamped thereby and to cause them to be severed where nicked.

3. A wire-twisting unit, consisting of a peripherally toothed wheel divided diametrically, means separately carrying the divided parts of said wheel so as to move the same toward and in contact with each other and clamp wires therebetween or away from each other, one of said divided parts having a projecting cutter to nick said wires prior to twisting the same and the other divided part having a groove between the walls of which and said cutter the wires are nicked, and means for rotating said divided parts as a single unit to twist the wires clamped therebetween and cause them to be severed where nicked.

4. A wire-twisting device, consisting of a peripherally toothed wheel composed of two separable sections between which two strands of wire are to be clamped, means associated with said separable sections to nick the two strands of wires prior to twisting the same, and means to rotate said wheel while the wires are clamped therebetween so as to twist the same and cause severance of the wire where nicked.

5. A wire-twisting device, comprising a pair of gear-carriers movable toward and from each other and having two strands of wire engaged thereby, said strands of wire being adapted to be moved inwardly when moving said carriers into contact with each other, each carrier having a semi-gear rotatably arranged therein adapted to form a complete gear-wheel when said gear-carriers are brought together, each semi-gear having a flat inner edge adapted to contact with the flat inner edge of the other and a transverse groove, said transverse grooves forming an axial opening in the complete gear wheel to receive said two strands of wire therein, and means in said axial opening to nick said strands of wire preparatory to twisting the same, and means to rotate said complete gear-wheel to cause twisting of the portion of the wire clamped between said semi-gears and separation of the twisted wires where nicked.

6. A wire-twisting device, comprising a peripherally toothed wheel composed of two separable sections, each section having oppositely-disposed hub portions and a semi-cylindrical keeper entering the ends of said hub portions to form a complete cylindrical bearing on which said peripherally toothed wheel rotates, said hub portions and separable sections being longitudinally grooved to receive the wires to be tied and each of said separable sections having means to nick the wires.

7. A wire-twisting device, comprising a wheel diametrically bisected to form two mating sections, each being provided with a hub portion co-operating with the hub portion of the mating section to form a complete hub, and keepers for said mating sections entering said hub portions from opposite ends on which said wheel rotates.

8. A wire-twisting device, comprising a wheel diametrically bisected to form two mating sections, each being provided with a hub portion that co-operates with the hub portion of the mating section to form a complete hub, and bearings for said mating sections externally and internally engaging said hub portions.

9. A wire-twisting device, comprising two gear sections co-operating to form a complete gear-wheel having a hub portion, said gear sections being provided on their meeting faces with wire-receiving grooves and wire-nicking means in said grooves to receive and nick wires adapted to be twisted, reciprocating carriers in which the said gear sections are independently supported for rotative movement, said carriers being formed to serve as guides for said wires, means to reciprocate said carriers to alternately separate and juxtapose the gear sections so as to grasp said wires and nick the same, and means for rotating said gear sections as a complete gear wheel while said carriers are juxtaposed.

10. A wire-twisting device, comprising a peripherally toothed wheel composed of two separable sections between which two strands of wire are to be clamped, means to support and move said separable sections into juxtaposition to clamp said wires, means associated with said separable sections to nick the two strands of wire so clamped preparatory to twisting the same, and means to rotate said separate sections on a common axis while the wires are clamped therebetween to cause said wires to be twisted and to sever the same during the twisting operation where nicked.

11. A wire-twisting device, comprising two semi-gears having opposite hub portions and semi-circular depressions formed in the ends of said hub portions, a carrier for each semi-gear having a concaved portion in which the hub portions of a semi-gear is entered, keepers secured to said carrier at opposite sides of each of said semi-gears entered in the concaved portions of the latter, means to move said carriers toward and from each other to juxtapose said semi-gears and form a complete gear-wheel and to separate said semi-gears, said semi-gears and keepers being grooved to form a wire passage therethrough when brought into juxtaposition, said keepers having wire-gripping means at their outer ends, means for rotating the gear-wheel formed by said semi-gears to twist the wires where passed through said wire passage, and means on said semi-gears to cause said wires to be nicked sufficiently to separate where nicked when twisted under rotation of said gear-wheel.

12. A wire-twisting device, comprising a peripherally toothed wheel composed of two separable sections, each section having oppositely-disposed hub portions and a semi-cylindrical keeper entering the ends of said hub portions to form a complete cylindrical bearing on which said peripherally toothed wheel rotates, said hub portions being longitudinally grooved to receive the wires to be tied and being equipped with means to nick the wires preparatory to twisting the same, and said keepers being provided with means to clamp the wire at opposite sides of said nicking means to cause the wires at the region between said clamping means to be intertwisted upon rotation of said peripherally toothed wheel.

13. A wire-twisting device, comprising a wheel diametrically bisected to form two mating sections, the front faces of said sections having means to lock the same together, each section being provided with a hub portion co-operating with the hub portion of the mating section to form a complete hub, and keepers for said mating sections internally engaging said hub portions.

14. A wire-twisting device, comprising two gear sections co-operating to form a complete gear-wheel, slidably mounted independent supporting means in which said sections are mounted for rotative movement, means for reciprocating said slidably mounted independent supporting means to alternately separate and juxtapose said gear sections, one of said gear sections having a removable wire nicker, and means to rotate the complete gear-wheel formed by said gear sections when juxtaposed to enable one section to be moved rotatably alternately from one of said supporting means to the other during the rotative movement of said complete gear-wheel.

15. A wire-twisting device, comprising two gear sections co-operating to form a complete gear-wheel, slidably mounted independent supporting means in which said sections are mounted for rotative movement, means for reciprocating said slidably mounted independent supporting means to alternately separate and juxtapose said sections, a wire nicker removably arranged in one of said sections, means to adjust said wire nicker with respect to the confronting face of said section, means to retain said wire nicker in any adjusted position, the other section of said complete gear-wheel being provided with a groove co-acting with said wire nicker, and means to rotate the complete gear-wheel formed by said gear sections when juxtaposed to enable one section to be moved rotatably alternately from one of said supporting means to the other during the rotative movement of said complete gear-wheel.

DANIEL C. KENNEDY.

CERTIFICATE OF CORRECTION.

Patent No. 2,233,133.   February 25, 1941.

DANIEL C. KENNEDY.

It is hereby certified that error appears in the above numbered patent requiring correction as follows: In the grant, lines 3 and 13, and in the heading to the printed specification, line 5, name of second assignee of one-half interest, for "Charles K. Pike" read --Charles J. Pike--, as shown by the record of assignments in this office; page 2, second column, line 61, for the word "retained" read --retainer--; page 3, second column, line 9, for "they" read --the--; page 4, first column, line 63, for "iner" read --inner--; page 5, second column, line 25, claim 12, for "calmp" read --clamp--; and that the said Letters Patent should be read with this correction therein that the same may conform to the record of the case in the Patent Office.

Signed and sealed this 1st day of April, A. D. 1941.

Henry Van Arsdale, (Seal)   Acting Commissioner of Patents.